United States Patent
Demaj

(10) Patent No.: US 7,925,286 B2
(45) Date of Patent: Apr. 12, 2011

(54) METHOD, A PROGRAM AND A MODULE TO ESTIMATE A DOPPLER MAXIMUM FREQUENCY AND AN OSCILLATOR FREQUENCY OFFSET, RECEIVER INCLUDING THE MODULE

(75) Inventor: Pierre Demaj, Nice (FR)

(73) Assignee: ST-Ericsson SA, Geneva (CH)

( * ) Notice: Subject to any disclaimer, the term of this patent is extended or adjusted under 35 U.S.C. 154(b) by 583 days.

(21) Appl. No.: 12/067,973

(22) PCT Filed: Sep. 25, 2006

(86) PCT No.: PCT/IB2006/053475
§ 371 (c)(1),
(2), (4) Date: Mar. 25, 2008

(87) PCT Pub. No.: WO2007/036866
PCT Pub. Date: Apr. 5, 2007

(65) Prior Publication Data
US 2008/0252512 A1    Oct. 16, 2008

(30) Foreign Application Priority Data
Sep. 27, 2005  (EP) .................................... 05300776

(51) Int. Cl.
*H04B 1/00*     (2006.01)
*H04L 27/06*    (2006.01)
*G01S 1/02*     (2010.01)

(52) U.S. Cl. ..................... 455/504; 455/63.1; 455/67.11; 455/255; 375/344; 342/104

(58) Field of Classification Search .................. 455/504, 455/63.1, 67.11, 255, 272, 295–296, 130, 455/258, 265, 334, 101; 375/344, 150, 232, 375/316, 340, 347; 342/299, 357.29, 104, 342/175; 370/235, 329
See application file for complete search history.

(56) References Cited

U.S. PATENT DOCUMENTS

| | | | | |
|---|---|---|---|---|
| 6,956,895 | B2* | 10/2005 | Vihriala | 375/148 |
| 7,599,453 | B2* | 10/2009 | Wilhelmsson | 375/344 |
| 2004/0082303 | A1* | 4/2004 | Giannakis et al. | 455/130 |
| 2004/0125771 | A1 | 7/2004 | Subrahmanya | |
| 2007/0293256 | A1* | 12/2007 | Merched et al. | 455/504 |

OTHER PUBLICATIONS

Baddour, K, E; et al "Nonparametric Doppler Spread Estimation for Flat Fading Channels" Wireless Communications and Networking, 2003. IEEE. Mar. 16, 2003, pp. 953-958.

(Continued)

*Primary Examiner* — Pablo N Tran
(74) *Attorney, Agent, or Firm* — William J. Kubida; Peter J. Meza; Hogan Lovells US LLP

(57) ABSTRACT

A method of estimating a Doppler maximum frequency $f_d$ and/or a local oscillator frequency offset $f_0$, the method comprising the steps of: computing a power density spectrum of a received radio signal over a whole frequency range, scanning the computed power density spectrum to determine a frequency sub-range $[f_{min}; f_{max}]$ which is not necessarily centered on 0 Hz, the signal power over the sub-range $[f_{min}; f_{max}]$ being equal to a predetermined percentage of the signal power over the whole frequency range, and estimating frequency $f_d$ and/or offset $f_0$ from frequencies $f_{min}$ and $f_{max}$.

13 Claims, 3 Drawing Sheets

OTHER PUBLICATIONS

Notification of Transmittal of the International Search Report and the Written Opinion of the International Searching Authority, or the Declaration, PCT/IB2006/053475, mailed Mar. 27, 2007, pp. 4.
Written Opinion of the International Searching Authority, PCT/IB2006/0153475, mailed Mar. 27, 2007, pp. 5.
3rd Generation Partnership Project; Technical Specification Group Services and System Aspects; Release 1999 Specifications, (3G TS 21.101 v1.0.0), Oct. 1999, Rel. 99, http://www.3gpp.org/specs/specs.html, Sophia Antipolis, Valbonne, France, pp. 1-21.
Dent, P. et al, "Jakes Fading Model Revisited", Electronics Letters, vol. 29, No. 13, Jun. 24, 1993, pp. 1162-1163.

* cited by examiner

METHOD, A PROGRAM AND A MODULE TO ESTIMATE A DOPPLER MAXIMUM FREQUENCY AND AN OSCILLATOR FREQUENCY OFFSET, RECEIVER INCLUDING THE MODULE

FIELD OF THE INVENTION

The present invention relates to a method, a program and a module to estimate a Doppler maximum frequency and/or an oscillator frequency offset, and a receiver including the module.

BACKGROUND OF THE INVENTION

In a radio communication system, the information bits are modulated at a transmitter end and consequently need to be demodulated at a receiver end. Thus, a radio receiver always has a RF (Radio Frequency) demodulation module. Basically, the RF demodulation module function consists of removing the carrier frequency from a received radio signal in order to recover a baseband signal. To perform this operation, a local oscillator part of the RF demodulation module, generates a frequency tone that ideally should be identical to the carrier frequency. The local oscillator should oscillate at the same frequency as the carrier frequency. Unfortunately, for several reasons (for instance the temperature variations) this local oscillator can drift. As a consequence, an oscillator frequency offset $f_0$ appears between the carrier frequency and the oscillation frequency of the local oscillator. This frequency offset causes a significant degradation of the overall performance of the receiver.

An existing solution is, therefore, to estimate offset $f_0$ and then to correct it.

For example, to this end, UMTS (Universal Mobile Telecommunications Systems) radio communication systems have common downlink physical channels P-CPICH (Primary Common Pilot Channel) and S-CPICH (Secondary Common Pilot Channel). Both CPICHs are fixed rate (30 kbits/s) downlink physical channels that carry a pre-defined bit sequence, also denoted as pilot symbols. As a result, a phase discrimination method using CPICH can be used. First, this known method estimates the phase variation between two consecutive pilot symbols. Then the frequency offset is obtained as the expectation of the following ratio:

$$f_o = E\left(\frac{\Delta\varphi}{\Delta T}\right) \quad (1)$$

where:
$\Delta\varphi$ stands for the phase variation between two consecutive pilot symbols,
$\Delta T$ is the inverse of the symbol rate, and
E( . . . ) denotes the expectation of the average function.

Actually, to have an accurate estimation of the oscillator frequency offset, the previously described measurement needs to be repeated and averaged over a large number of pilot symbols. Consequently, the phase discrimination method is a long process triggered at the pilot symbol rate and which requires some time to have the local oscillator adjusted precisely.

On the other hand, due to radio receiver displacements, the frequency of the received radio signal is offset. This is known as the Doppler effect. As a consequence, for example, a high percentage of the baseband signal power in a power density spectrum lies in a frequency sub-range $[-f_d; f_d]$, where frequency $f_d$ is the Doppler maximum frequency. Sub-range $[-f_d; f_d]$ is known as the Doppler bandwidth.

For example, frequency $f_d$ is useful to estimate the wireless receiver speed.

It is known from "Non parametric Doppler Spread Estimation for Flat Fading Channels", Kareem E. Baddour, Norman C. Beaulieu, IEEE 2003, that $f_d$ can be estimated as the frequency for which the signal power in the sub-range $[-f_d; f_d]$ is equal to a certain percentage of the total signal power, as expressed by the following relation:

$$\frac{\int_{-f_d}^{f_d} P_{yy}(f)df}{\int_{-f_s/2}^{f_s/2} P_{yy}(f)df} > \psi \quad (2)$$

where
$\psi$ is an arbitrary constant power threshold belonging to ]0,1[
$f_s$ is the sampling frequency, and
$P_{yy}(f)$ is an estimate of the signal power at frequency f.
$P_{yy}(f)$ is computed using FFT (Fast Fourier Transform) algorithm from the received baseband signal on a pilot channel like CPICH, for example.

However, the FFT-based $f_d$ estimation is not robust at all to oscillator frequency offset.

Usually, frequency $f_d$ and offset $f_0$ are estimated independently, using two dedicated functional units.

SUMMARY OF THE INVENTION

Accordingly, it is an object of the invention to provide an $f_d$ estimation method which is more robust to oscillator frequency offset.

With the foregoing and other objects in view there is provided in accordance with the invention a method of estimating $f_d$, comprising the steps of:
computing a power density spectrum of the received radio signal over a whole frequency range,
scanning the computed power density spectrum to determine a frequency sub-range $[f_{min}; f_{max}]$ the signal power over the sub-range $[f_{min}; f_{max}]$ being equal to a predetermined percentage of the signal power over the whole frequency range, and
estimating frequency $f_d$ from frequencies $f_{min}$ and $f_{max}$,
wherein the scanning step is adapted to determine a frequency sub-range $[f_{min}; f_{max}]$ which is not necessarily centered on 0 Hz.

Whatever the value of oscillator frequency offset $f_0$, the $[f_{min}; f_{max}]$ sub-range width found with the above method is always equal to 2. $f_d$. Therefore, the value of offset $f_0$ does not influence the estimation of $f_d$ from the values of frequencies $f_{min}$ and $f_{max}$. As a result, the above method is robust to oscillator offset $f_0$.

The embodiment of the above $f_d$ estimation method may comprise one or several of the following features:
the method also comprises the step of estimating a frequency offset $f_0$ of a local oscillator of the wireless receiver from the same frequencies $f_{min}$ and $f_{max}$ as the one used to estimate frequency $f_d$, the local oscillator being used to remove a carrier frequency from the received radio signal,
the method comprises the step of calculating a speed estimation of the wireless receiver displacement from the estimated frequency $f_d$.

The above embodiments of the $f_d$ estimation method present the following advantage:

the power density spectrum computing step and the power density spectrum scanning step are common to both $f_d$ and $f_0$ estimations, so that truly integrated devices for $f_d$ and $f_0$ estimation can be designed.

It is another object of the invention to provide an oscillator frequency offset estimation method which is faster. Thus, the invention also provides an oscillator frequency offset method that comprises the steps of:

computing a power density spectrum of the received radio signal over a whole frequency range, scanning the computed power density spectrum to determine a frequency sub-range $[f_{min}; f_{max}]$ the signal power over the sub-range $[f_{min}; f_{max}]$ being equal to a predetermined percentage of the signal power over the whole frequency range, and estimating offset $f_0$ from frequencies $f_{min}$ and $f_{max}$, wherein the scanning step is adapted to determine a frequency sub-range $[f_{min}; f_{max}]$ which is not necessarily centered on 0 Hz.

Computing the power density spectrum does not require measurements of phase variations between consecutive pilot symbols, so that this method of estimating offset $f_0$ is simpler and faster.

The embodiments of the above $f_d$ or $f_0$ estimation method may comprise one or several of the following features:

a step of searching for a maximum power peak in sub-range $[f_{min}; f_{max}]$ which is higher than a predetermined threshold and a step of indicating the presence of a direct Line-of-Sight between the wireless receiver and a transmitter of the radio signal if a maximum power peak is found;

a step of filtering, averaging and downsampling the received signal before computing the power density spectrum from the filtered, averaged and downsampled signal; and building the power density spectrum from a pilot channel used only to transmit predetermined pilots.

The above embodiments of the $f_d$ or $f_0$ estimation method present the following advantages:

looking for a maximum power peak in sub-range $[f_{min}; f_{max}]$ is a simple method to detect a direct Line-of-Sight which can be fully integrated with a method of estimating $f_d$ and $f_0$, and filtering and averaging the received signal significantly reduces the noise, which allows to have much more precise $f_d$ and $f_0$ estimations.

The invention also relates to a program having instructions to execute the above methods.

The invention also relates to an electronic module to estimate a Doppler maximum frequency $f_d$ in a radio signal due to a wireless receiver displacement, the module comprising:

a computing unit to build a power density spectrum of the received radio signal over a whole frequency range, a scanner adapted to determine a frequency sub-range $[f_{min}; f_{max}]$ the signal power in the sub-range $[f_{min}; f_{max}]$ being equal to a predetermined percentage of the signal power over the whole frequency range, and an estimator to estimate frequency $f_d$ from frequencies $f_{min}$ and $f_{max}$, wherein the scanner is adapted to determine a frequency sub-range $[f_{min}; f_{max}]$ which is not necessarily centered on 0 Hz.

The embodiments of the above electronic module may comprise one or several of the following features:

the module also comprises an estimator to estimate a frequency offset $f_0$ of a local oscillator of the wireless receiver from frequencies $f_{min}$ and $f_{max}$ as determined by the scanner, the local oscillator being used to remove a carrier frequency from the received radio signal.

The invention also relates to an electronic module to estimate a frequency offset $f_0$ of a local oscillator of a wireless radio signal receiver, the local oscillator being used to remove a carrier frequency from the received radio signal, the module comprising:

a computing unit to build a power density spectrum of the received signal over a whole frequency range, a scanner adapted to determine a frequency sub-range $[f_{min}; f_{max}]$ which is not necessarily centered on 0 Hz, the signal power over the sub-range $[f_{min}; f_{max}]$ being equal to a predetermined percentage of the signal power over the whole frequency range, and an estimator to estimate offset $f_0$ from frequencies $f_{min}$ and $f_{max}$.

The embodiments of the above electronic modules to estimate $f_d$ or $f_0$ may comprise one or several of the following features:

the module comprises a detector of a maximum power peak in the sub-range $[f_{min}; f_{max}]$ which is over a predetermined threshold; the detector being adapted to indicate the presence of a direct Line-of-Sight between the wireless receiver and a signal transmitter of the radio signal if a maximum power peak is detected.

The invention also relates to a radio receiver comprising at least one of the electronic modules to estimate $f_d$ or $f_0$.

These and other aspects of the invention will be apparent from the following description, drawings and claims.

DESCRIPTION OF THE PREFERRED EMBODIMENTS

Figure 1:
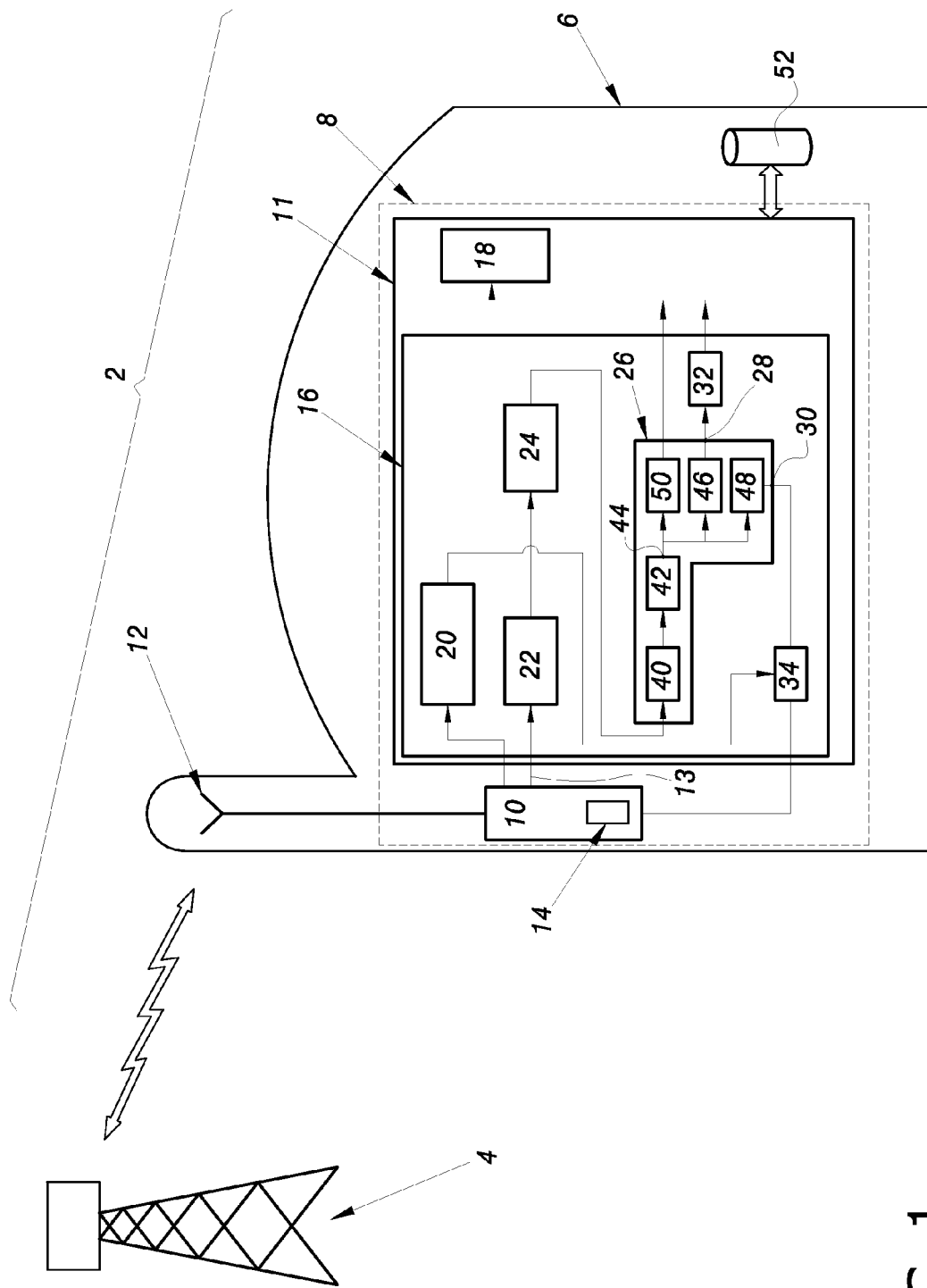
FIG. 1 is a schematic diagram of the structure of a wireless telecommunication system.

FIG. 1 shows parts of a UMTS radio communication system. System 2 comprises at least one node B like a base station 4 and one piece of wireless telecommunication user equipment 6 like a mobile phone. In the following description, functions or constructions well-known to a person of ordinary skill in the art are not described in detail.

Both node B and user equipment 6 include a wireless transmitter and a wireless receiver. For simplicity, only a wireless receiver 8 of user equipment 6 is shown in FIG. 1.

Receiver 8 has a radio frequency demodulation module 10 and a baseband processor 11.

Module 10 receives through an antenna 12 the radio signal transmitted by base station 4. Module 10 also demodulates the received radio signal and separates the different multiplexed channels. A plurality of channel signals is obtained. Each channel signal is transmitted from module 10 to processor 11 as a baseband signal. In UMTS radio communication systems, one of the physical channels is a CPICH (Common Pilot Channel) which is transmitted to processor 11 through a physical link 13, for example.

Module 10 has a local oscillator 14 that generates a frequency tone that ideally should match exactly the carrier frequency used to modulate the radio signal. Oscillator 14 is tunable.

Processor 11 has an inner receiver 16 and an outer receiver 18 connected to an output of inner receiver 16.

Inner receiver 16 includes a rough frequency offset estimator 20 to roughly estimate frequency offset $f_0$. This rough frequency offset estimation is made from pilot symbols received through the CPICH or from data received through other downlink physical channels. Estimator 20 is conventional and will not be described here in detail.

Inner receiver 16 also comprises a channel estimation filter 22 having an input connected to link 13 and an output connected to an input of an averaging and downsampling module 24.

Filter 22 uses an estimation of the received signal deformation introduced by the transport channel. For example, filter 22 uses an estimation of the consequence on the received signal of the existence of multi-path between base station 4 and user equipment 6 to remove the noise.

Module 24 averages and downsamples the symbol filtered by filter 22 by a factor of 10, for example.

An output of module 24 is connected to an input of a joint frequency offset and Doppler maximum frequency estimating module 26. Module 26 has outputs 28 and 30 to output an estimation of $f_d$ and a fine estimation of $f_0$, respectively.

Output 28 is connected to an input of a speed calculator 32. Speed calculator 32 calculates an estimation of the wireless radio receiver speed or velocity from the $f_d$ estimation. Inner receiver 16 outputs the estimated speed v.

Output 30 is connected to an input of an oscillator tuner 34. Tuner 34 has another input connected to rough estimator 20 to receive the rough estimation of $f_0$. Tuner 34 is designed to control oscillator 14 according to the rough and/or fine estimations of $f_0$.

Module 26 has a power density spectrum computing unit 40 and a scanner 42. An input of unit 40 is connected to an output of module 24 to receive the averaged and downsampled symbols. Unit 40 is able to build the power density spectrum of the pilot signal received through the pilot channel.

Scanner 42 is adapted to determine a frequency sub-range $[f_{min}; f_{max}]$ which is not necessarily centered on 0 Hz, so that the pilot signal power over the sub-range is equal to a predetermined percentage of the total pilot signal power.

An output 44 of scanner 42 is connected to a Doppler maximum frequency estimator 46 and to a fine frequency offset estimator 48. Estimator 46 estimates $f_d$ from frequencies $f_{min}$ and $f_{max}$ and delivers the estimated value to output 28.

Estimator 48 estimates $f_0$ from frequencies $f_{min}$ and $f_{max}$ and outputs the estimated value to output 30.

Module 26 has also a Line-of-Sight detector 50 with an input connected to output 44. Detector 50 detects the presence of a direct Line-of-Sight between base station 4 and equipment 6 from the analysis of the power density spectrum between sub-range $[f_{min}; f_{max}]$.

Figure 2:
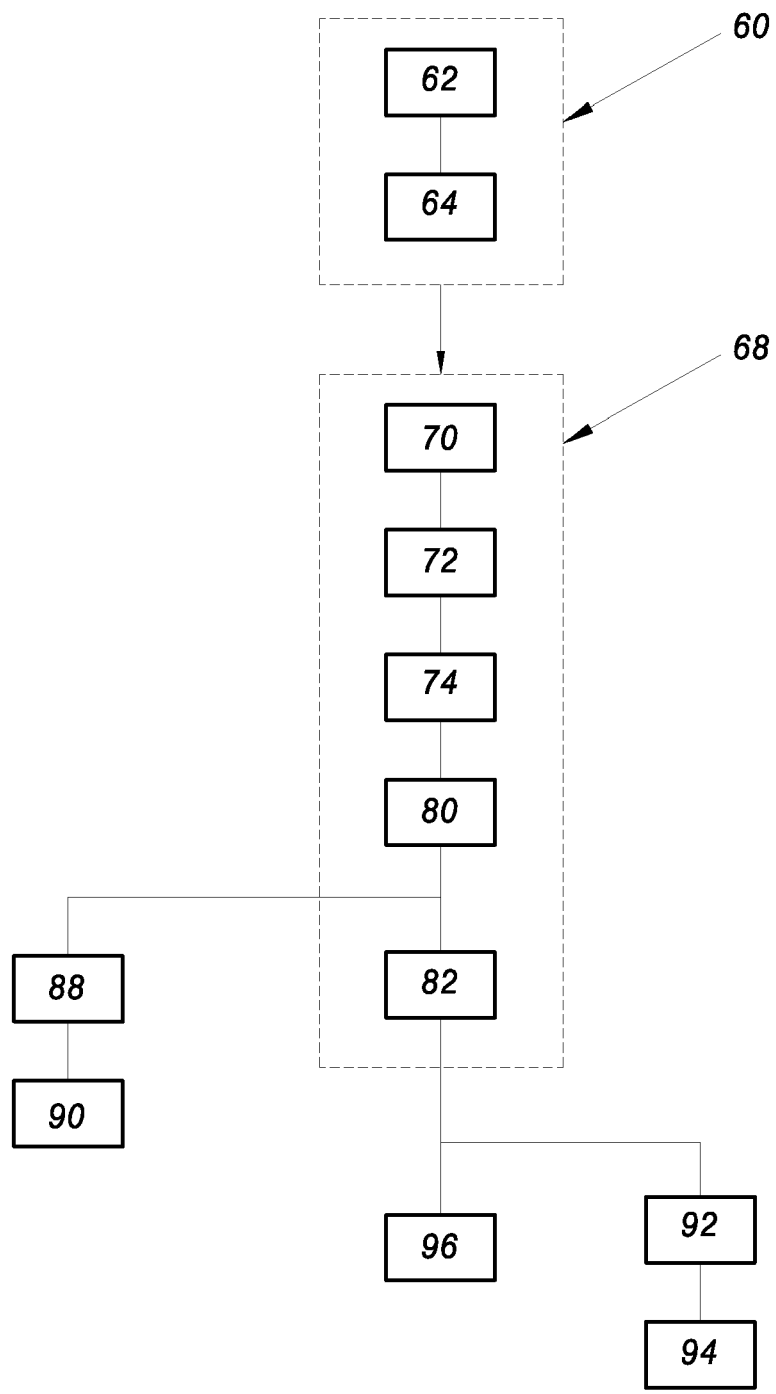
FIG. 2 is a flowchart of a method of estimating $f_d$ and $f_0$.

For example, module 26 is implanted in an electronic programmable calculator adapted to execute instructions recorded in a memory. For instance, baseband processor 11 is a programmable calculator and is connected to a memory 52 including the instructions to execute the method of FIG. 2 when these instructions are executed by processor 11.

The operation of receiver 8 will now be described with reference to FIGS. 2 through 6.

Radio frequency module 10 demodulates and demultiplexes the received radio signal to output baseband signals to processor 11. Processor 11 processes the baseband signal.

Initially, a rough oscillator frequency tuning phase 60 is executed.

During phase 60, in step 62, rough estimator 20 roughly estimates $f_0$ using conventional method and outputs a rough estimation of $f_0$.

Then, in a step 64, tuner 34 tunes the oscillator frequency of oscillator 14 according to the rough estimation of $f_0$.

At the end of phase 60, the oscillation frequency of oscillator 14 may still not be exactly equal to the carrier frequency of the radio signal to be demodulated because during phase 60 only a rough estimation of $f_0$ is used. The difference existing at the end of phase 60 between the carrier frequency and the oscillation frequency of oscillator 14 is called the residual frequency offset hereinafter.

However, for example it is assumed that in the case of a UMTS telecommunication system, the rough estimation of $f_0$ is good enough so that the residual frequency offset is smaller than 200 Hz.

Once the rough oscillator frequency tuning phase 60 is over, a joint $f_d$ and $f_0$ estimation phase 68 is carried out.

In step 70, filter 22 performs a channel estimation filtering on the pilot symbols received through CPICH. Step 70 has no impact on the sampling frequency $f_s$.

Subsequently, in step 72, module 24 averages and downsamples the filtered pilot symbols by a factor of 10. After downsampling, one averaged value only is issued per slot, and consequently at this level the sampling frequency $f_s$ is equal to 1.5 kHz. In fact, the symbol rate on the downlink pilot channel CPICH is fixed according to the UMTS standard, equal to 15 kbs (Kilo bauds per second) at the inner receiver input. It also corresponds to 10 CPICH complex symbol per slot, QPSK (Quadrature Phase-Shift Keying) being applied. In the UMTS standard, the signal is divided into frames, each frame having 15 slots and each slot including 2560 chips. Furthermore, the UMTS standard requires the user equipment to support speed as great as 250 Km/h, which leads to a maximum Doppler frequency $f_d$ of about 500 Hz. Having in mind the Nyquist criteria, the maximum received pilots frequency observable with $f_s=1.5$ kHz is 750 Hz. As a consequence, it is understood why in this example module 26 is to be applied when the residual frequency offset is already lower than 200 Hz (taking a margin of 50 Hz).

In step 74, unit 40 computes the power density spectrum of the averaged and downsampled pilot symbols output by module 24. For example, unit 40 uses a fast Fourier transform (FFT) to build the power density spectrum.

Figure 3:
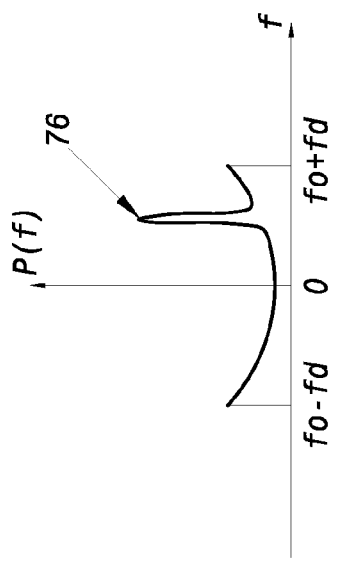
FIG. 3 to 6 are graphs of examples of power density spectrum obtained in the method of FIG. 2.

FIG. 3 shows a first example of a power density spectrum that can be expected according to Jakes' model when there is no residual frequency offset $f_0$. The horizontal axis represents the frequencies and the vertical axis represents the power.

According to this model, the most significant part of the signal power is within the sub-range $[-f_d; f_d]$, where $f_d$ is the Doppler maximum frequency.

More precisely, according to Jakes' model, if the scattered radio signal comes from every direction with equal probability, the power density spectrum is approximated by the following relation:

$$P(f) = \frac{\sigma_s^2}{\pi\sqrt{f^2 - f_d^2}} \text{ for } |f| < f_d \text{ and } 0 \text{ elsewhere} \quad (3)$$

where:
$\sigma_s^2$ accounts for the power of the signal in an interval in which it can be considered stationary, and
$f_d$ is the Doppler maximum frequency.

Jake's model is used here to characterize the power spectrum density of the received pilot symbols.

More discussion of Jakes' model may be found in P. Dent, G. E. Bottomley, and T. Croft, "Jakes' Fading Model Revisited", Electronics Letters, vol. 29, no. 13, pp. 1162-1163 (Jun. 24, 1993).

Figure 4:
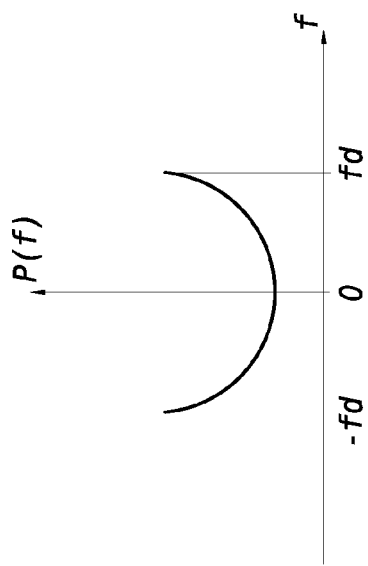

FIG. 4 shows a second example of a power density spectrum when there is a residual frequency offset $f_0$. As can be noticed, the most significant part of the signal power is then in the sub-range $[-f_d; f_0+f_d]$.

Figure 5:
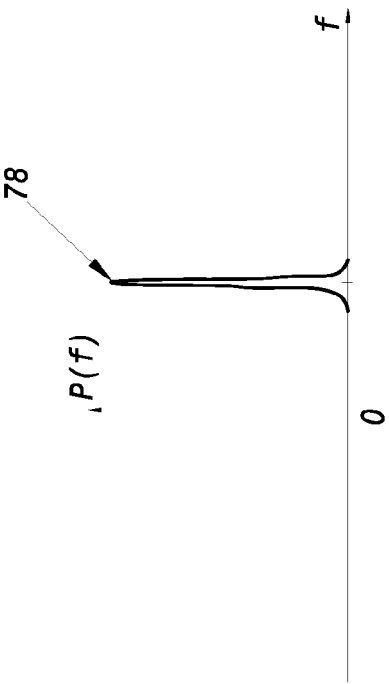

FIG. 5 shows a third example of an expected power density spectrum if there is a direct Line-of-Sight between user equipment 6 and base station 4. As shown in FIG. 5, the existence of a direct Line-of-Sight results in the presence of a power peak 76 in the frequency range $[f_0-f_d; f_0+f_d]$ which is higher than the power peak at frequencies $f_0-f_d$ and $f_0+f_d$.

In fact, if a direct Line-of-Sight exists, this means that there is a direct path between base station 4 and user equipment 6. As the path is direct, the received signal is less attenuated, and as a result, peak 76 appears in the power density spectrum.

Figure 6:
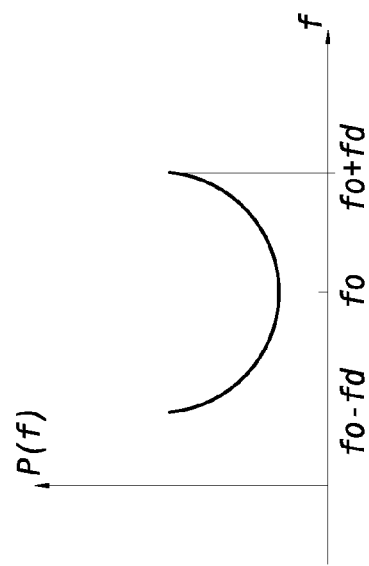

Finally, FIG. 6 shows a fourth example of a power density spectrum that can be computed in step 74. The power density spectrum of FIG. 6 has only one narrow maximum power peak 78 which concentrates nearly all the signal power. This can happen if the user equipment speed is very low ($f_d$ is small) and $f_0$ is high. This can also happen if the speed is not necessarily low and there is a direct Line-of-Sight between base station 4 and user equipment 6. In the particular case of FIG. 6, the rough frequency offset estimation $f_0$ given by estimator 20 is used to discriminate between a high $f_0$ with a low $f_d$ and the existence of a direct line of sight.

Once the power density spectrum has been computed, in step 80 scanner 42 scans the computed power density spectrum to find the frequencies $f_{min}$ and $f_{max}$ for which the signal power over sub-range $[f_{min}; f_{max}]$ is equal to a predetermined percentage of the total channel signal power. For example, the predetermined percentage is a constant higher than 0.8 and preferably higher than 0.9.

For example, sub-range $[f_{min}; f_{max}]$ is found using the following relation:

$$\frac{\int_{f_{min}}^{f_{max}} P_{yy}(f)df}{\int_{-f_s/2}^{f_s/2} P_{yy}(f)df} > \psi \quad (4)$$

where:
$P_{yy}(f)$ is the discrete fast Fourier transform for the frequency f, frequency f being within the range $[f_s/2; f_s/2]$, and
$f_s$ is the sampling frequency.

For example, $P_{yy}(f)$ can be computed using the following relation:

$$P_{yy}(f) = \frac{T}{N} \left| \sum_{n=0}^{N-1} y(n) \exp(-j2\pi fnT) \right|^2 \quad (5)$$

where:
T is the sampling period;
y(n) is the discrete signal in the time domain;
n is an integer varying from 0 to N−1.

Subsequently, in step 82, $f_d$ and $f_0$ are estimated from the values of frequencies $f_{min}$ and $f_{max}$ by estimators 46 and 48 respectively.

For example, estimator 46 estimates offset $f_0$ according to the following relation:

$$f_o = \frac{f_{min} + f_{max}}{2} \quad (6)$$

For instance, estimator 48 estimates frequency $f_d$ according to one of the following relations:

$$f_d = f_{max} - f_o \quad (7)$$

$$f_d = \frac{f_{max} - f_{min}}{2} \quad (8)$$

In parallel with step 82, in step 88, detector 50 detects a possible direct Line-of-Sight using the power density spectrum computed in step 74.

For example, detector 50 searches within frequency sub-range $[f_{min}; f_{max}]$ to a power peak greater than an arbitrary threshold $S_1$. If such a maximum power peak is found, detector 50 indicates the existence of a direct Line-of-Sight and outputs the frequency position and the power of detected peak.

In step 90, if a direct Line-of-Sight has been detected, this information may be used to determine the position of the user equipment. For example, the frequency position of the maximum power peak may be used to determine an angle between the user equipment displacement direction and the incidence direction of the received signal. The power of the peak may be used to determine the propagation time of the signal between base station 4 and user equipment 6, for example.

In step 92, calculator 32 calculates an estimation of the speed v of the user equipment from the estimation of frequency $f_d$. For example, in step 92, calculator 32 uses the following relation:

$$f_d = \frac{v}{c} \cdot f_c \quad (9)$$

where:
v is the wireless receiver speed,
c the speed of light, and
$f_c$ the channel carrier frequency.

The bandwidth of the spectrum is linked with the user equipment speed, via the Doppler shift equation (9) which gives $f_d$.

Subsequently, in step 94 the estimation of speed may be used to tune an element of receiver 8 as disclosed in the application US 2004/0125771 to Subrahmanya.

Finally, in step 96, tuner 34 uses the estimation of $f_0$ established in step 82 to fine tune the frequency of oscillator 14.

Many additional embodiments are possible. For example, speed calculator 32 may be omitted or implemented outside inner receiver 16. Filter 22 may also be omitted as may detector 50 in a simplified implementation.

Module 26 may also be used in a receiver of base station 4 and more generally in any receiver of radio signals.

Module 26 can be applied to any wireless telecommunication system using pilot channels dedicated to transport pilot symbols and to any wireless communication system transmitting signals having predetermined pilot symbols for channel estimation.

If one is only interested in estimating $f_d$ or $f_0$ or information on a direct Line-of-Sight, the unnecessary elements of module 26 may be omitted. For example, in one embodiment, estimator 48 and detector 50 can be omitted if the only valuable information is the $f_d$ estimate. In another embodiment, estimators 46 and 48 are omitted if only information on the direct Line-of-Sight is to be obtained.

The invention claimed is:

1. A method of estimating a Doppler maximum frequency $f_d$ of a received radio signal due to a wireless receiver displacement, the method comprising the steps of:
   computing a power density spectrum of the received radio signal over a whole frequency range,
   scanning the computed power density spectrum to determine a frequency sub-range $[f_{min}; f_{max}]$, the signal power over the sub-range $[f_{min}; f_{max}]$ being equal to a predetermined percentage of the signal power over the whole frequency range, and
   estimating frequency $f_d$ from frequencies $f_{min}$ and $f_{max}$, wherein the scanning step is adapted to determine a frequency sub-range $[f_{min}; f_{max}]$ which is not necessarily centered on 0 Hz.

2. The method according to claim 1, wherein the method also comprises the step of estimating a frequency offset $f_0$ of a local oscillator of the wireless receiver from the same frequencies $f_{min}$ and $f_{max}$ as the one used to estimate frequency $f_d$, the local oscillator being used to remove a carrier frequency from the received radio signal.

3. The method according to claim 1, wherein the method comprises the step of calculating a speed estimation of the wireless receiver displacement from the estimated frequency $f_d$.

4. A method to estimate a frequency offset $f_0$ of a local oscillator of a wireless radio signal receiver, the local oscillator being used to remove a carrier frequency from the received radio signal, the method comprising the steps of:
   computing a power density spectrum of the received radio signal over a whole frequency range,
   scanning the computed power density spectrum to determine a frequency sub-range $[f_{min}; f_{max}]$, the signal power over the sub-range $[f_{min}; f_{max}]$ being equal to a predetermined percentage of the signal power over the whole frequency range, and
   estimating offset $f_0$ from frequencies $f_{min}$ and $f_{max}$, wherein the scanning step is adapted to determine a frequency sub-range $[f_{min}; f_{max}]$ which is not necessarily centered on 0 Hz.

5. The method according to claim 4, wherein it comprises a step of searching for a maximum power peak in the sub-range $[f_{min}; f_{max}]$ which is higher than a predetermined threshold and a step of indicating the presence of a direct Line-of-Sight between the wireless receiver and a transmitter of the radio signal if a maximum power peak is found.

6. The method according to claim 4, wherein the method comprises the step of filtering, averaging and downsampling the received signal before computing the power density spectrum from the filtered, averaged and downsampled signal.

7. The method according to claim 4, wherein the power density spectrum is built from a pilot channel used only to transmit predetermined pilots.

8. A program having instructions to execute a method according to claim 4, when the instructions are executed by an electronic calculator.

9. An electronic module to estimate a Doppler maximum frequency $f_d$ in a radio signal due to a wireless receiver displacement, the module comprising:
   a computing unit to build a power density spectrum of the received radio signal over a whole frequency range,
   a scanner adapted to determine a frequency sub-range $[f_{min}; f_{max}]$, the signal power in the sub-range $[f_{min}; f_{max}]$ being equal to a predetermined percentage of the signal power over the whole frequency range, and
   an estimator to estimate frequency $f_d$ from frequencies $f_{min}$ and $f_{max}$, wherein the scanner is adapted to determine a frequency sub-range $[f_{min}; f_{max}]$ which is not necessarily centered on 0 Hz.

10. The electronic module according to claim 9, wherein the module also comprises an estimator to estimate a frequency offset $f_0$ of a local oscillator of the wireless receiver from frequencies $f_{min}$ and $f_{max}$ as determined by the scanner, the local oscillator being used to remove a carrier frequency from the received radio signal.

11. The electronic module according to claim 9, wherein the module comprises a detector of a maximum power peak in the sub-range $[f_{min}; f_{max}]$ which is over a predetermined threshold and the detector being adapted to indicate the presence of a direct Line-of-Sight between the wireless receiver and a signal transmitter of the radio signal if a maximum power peak is detected.

12. An electronic receiver comprising:
   a channel estimation filter to filter a received radio signal having predetermined pilots,
   an averaging and downsampling module to average and downsample the filtered signal, and
   an electronic module according to claim 9, wherein the computing unit builds the power density spectrum from the averaged and downsampled signal output by the averaging and downsampling module.

13. An electronic module to estimate a frequency offset $f_0$ of a local oscillator of a wireless radio signal receiver, the local oscillator being used to remove a carrier frequency from the received radio signal, the module comprising:
   a computing unit to build a power density spectrum of the received signal over a whole frequency range,
   a scanner adapted to determine a frequency sub-range $[f_{min}; f_{max}]$ which is not necessarily centered on 0 Hz, the signal power over the sub-range $[f_{min}; f_{max}]$ being equal to a predetermined percentage of the signal power over the whole frequency range, and
   an estimator to estimate offset $f_0$ from frequencies $f_{min}$ and $f_{max}$.

* * * * *